US011426821B2

(12) United States Patent
Berube et al.

(10) Patent No.: US 11,426,821 B2
(45) Date of Patent: *Aug. 30, 2022

(54) ALUMINUM METAL-CORED WELDING WIRE

(71) Applicant: HOBART BROTHERS LLC, Troy, OH (US)

(72) Inventors: Patrick Berube, Traverse City, MI (US); Gregory J. Bramer, Traverse City, MI (US); Shuang Liu, Appleton, WI (US)

(73) Assignee: HOBART BROTHERS LLC, Troy, OH (US)

( * ) Notice: Subject to any disclaimer, the term of this patent is extended or adjusted under 35 U.S.C. 154(b) by 550 days.

This patent is subject to a terminal disclaimer.

(21) Appl. No.: 16/358,415

(22) Filed: Mar. 19, 2019

(65) Prior Publication Data

US 2019/0210162 A1 Jul. 11, 2019

Related U.S. Application Data

(63) Continuation-in-part of application No. 14/839,406, filed on Aug. 28, 2015, now Pat. No. 10,850,356.
(Continued)

(51) Int. Cl.
*B23K 35/28* (2006.01)
*B23K 35/02* (2006.01)
(Continued)

(52) U.S. Cl.
CPC ........ *B23K 35/286* (2013.01); *B23K 35/0261* (2013.01); *B23K 35/406* (2013.01); *C22C 21/08* (2013.01); *B82Y 30/00* (2013.01)

(58) Field of Classification Search
CPC ............. B23K 35/286; B23K 35/0261; B23K 35/406; C22C 21/08; B82Y 30/00
(Continued)

(56) References Cited

U.S. PATENT DOCUMENTS 3,787,658 A 1/1974 Kammer
3,834,002 A 9/1974 Sissons
(Continued)

FOREIGN PATENT DOCUMENTS

CN 101219508 7/2008
CN 101941121 1/2011
(Continued)

OTHER PUBLICATIONS

International Search Report from PCT application No. PCT/US2015/067319, dated Mar. 23, 2016, 14 pgs.
(Continued)

*Primary Examiner* — Jimmy Chou
(74) *Attorney, Agent, or Firm* — McAndrews Held & Malloy, Ltd.

(57) ABSTRACT

The present disclosure relates to a metal-cored welding wire, and, more specifically, to a metal-cored aluminum welding wire for arc welding, such as Gas Metal Arc Welding (GMAW) and Gas Tungsten Arc Welding (GTAW). A disclosed metal-cored aluminum welding wire includes a metallic sheath and a granular core disposed within the metallic sheath. The granular core includes a first alloy having a plurality of elements, wherein the first alloy has a solidus that is lower than each of the respective melting points of the plurality of elements of the first alloy. The granular core comprises aluminum metal matrix nano-composites (Al-MMNCs) that comprise an aluminum metal matrix and ceramic nanoparticles.

19 Claims, 2 Drawing Sheets

Related U.S. Application Data

(60) Provisional application No. 62/120,752, filed on Feb. 25, 2015.

(51) Int. Cl.
*C22C 21/08* (2006.01)
*B23K 35/40* (2006.01)
*B82Y 30/00* (2011.01)

(58) Field of Classification Search
USPC .................................................. 219/137 MW
See application file for complete search history.

(56) References Cited

U.S. PATENT DOCUMENTS

| | | | | |
|---|---|---|---|---|
| 3,843,867 A * | 10/1974 | Helton | ................. | B23K 35/368 |
| | | | | 219/137 R |
| 4,203,188 A * | 5/1980 | Blanpain | ............ | B23K 35/0266 |
| | | | | 219/145.22 |
| 4,366,364 A * | 12/1982 | Arai | ..................... | B23K 35/368 |
| | | | | 219/137 WM |
| 4,510,374 A * | 4/1985 | Kobayashi | ......... | B23K 35/3608 |
| | | | | 219/146.1 |
| 4,571,480 A * | 2/1986 | Sakai | ................... | B23K 35/368 |
| | | | | 219/145.22 |
| 4,683,368 A | 7/1987 | Das | | |
| 4,900,895 A | 2/1990 | Marshall | | |
| 5,003,155 A * | 3/1991 | Chai | ................. | B23K 35/0255 |
| | | | | 219/145.22 |
| 5,099,103 A * | 3/1992 | Yamada | ............. | B23K 35/3608 |
| | | | | 219/145.22 |
| 5,120,931 A * | 6/1992 | Kotecki | ............. | B23K 35/3608 |
| | | | | 219/146.22 |
| 5,219,425 A * | 6/1993 | Nishikawa | ......... | B23K 35/3608 |
| | | | | 219/145.22 |
| 5,403,377 A * | 4/1995 | Masaie | ................ | B23K 35/368 |
| | | | | 75/304 |
| 5,514,422 A | 5/1996 | Mccune | | |
| 5,525,779 A | 6/1996 | Santella | | |
| 5,542,602 A | 8/1996 | Gaynes | | |
| 5,580,475 A * | 12/1996 | Sakai | ................. | B23K 35/0266 |
| | | | | 219/145.22 |
| 5,781,846 A | 7/1998 | Jossick | | |
| 5,854,463 A * | 12/1998 | Yamashita | ........... | B23K 35/368 |
| | | | | 219/145.22 |
| 5,903,814 A * | 5/1999 | Miura | ................. | B23K 35/368 |
| | | | | 428/552 |
| 6,042,782 A * | 3/2000 | Murata | ............. | B23K 35/3086 |
| | | | | 219/146.23 |
| 6,140,607 A * | 10/2000 | Kamada | ............... | B23K 35/368 |
| | | | | 219/145.22 |
| 6,367,686 B1 * | 4/2002 | Abriles | .............. | B23K 35/3605 |
| | | | | 228/206 |
| 6,414,269 B2 * | 7/2002 | Kim | ..................... | B23K 35/368 |
| | | | | 219/145.22 |
| 6,441,334 B1 * | 8/2002 | Aida | .................... | B23K 35/368 |
| | | | | 219/74 |
| 6,479,796 B2 * | 11/2002 | Goto | ................. | B23K 35/0266 |
| | | | | 219/145.22 |
| 6,513,728 B1 | 2/2003 | Hughes | | |
| 6,547,892 B2 * | 4/2003 | Kim | ........................ | C22C 38/26 |
| | | | | 148/325 |
| 6,559,417 B2 * | 5/2003 | Kim | ..................... | B23K 35/368 |
| | | | | 219/145.22 |
| 6,664,508 B1 * | 12/2003 | Johnson | ............. | B23K 35/3608 |
| | | | | 219/136 |
| 6,911,099 B2 * | 6/2005 | Magnusen | ................ | C22F 1/05 |
| | | | | 148/417 |
| 6,933,468 B2 | 8/2005 | Keegan | | |
| 7,170,032 B2 * | 1/2007 | Flood | ................. | B23K 35/222 |
| | | | | 219/137 R |
| 7,491,910 B2 * | 2/2009 | Kapoor | ............. | B23K 35/0261 |
| | | | | 219/145.1 |
| 8,153,935 B2 * | 4/2012 | Jang | ....................... | B23K 35/22 |
| | | | | 219/145.22 |
| 8,704,136 B2 | 4/2014 | Posch | | |
| 8,878,099 B2 * | 11/2014 | Inoue | ................. | B23K 35/3605 |
| | | | | 219/145.22 |
| 9,227,272 B2 | 1/2016 | Li | | |
| 9,770,789 B2 * | 9/2017 | Saruwatari | ......... | B23K 35/3608 |
| 10,960,497 B2 * | 3/2021 | Yahata | ............... | B23K 35/3606 |
| 2002/0153364 A1 * | 10/2002 | North | ................. | B23K 35/3608 |
| | | | | 219/137 WM |
| 2003/0094444 A1 * | 5/2003 | Kato | ................... | B23K 35/368 |
| | | | | 219/145.22 |
| 2003/0098296 A1 * | 5/2003 | Keegan | ................ | B23K 35/286 |
| | | | | 219/145.22 |
| 2003/0116234 A1 * | 6/2003 | Santella | .................. | B23K 35/28 |
| | | | | 148/437 |
| 2003/0118855 A1 * | 6/2003 | Santella | ................ | B32B 15/017 |
| | | | | 428/558 |
| 2004/0020912 A1 * | 2/2004 | Hara | .................. | B23K 35/3053 |
| | | | | 219/145.22 |
| 2004/0079742 A1 | 4/2004 | Kelly | | |
| 2007/0051702 A1 | 3/2007 | James | | |
| 2008/0057341 A1 * | 3/2008 | Bouillot | ................ | B23K 9/167 |
| | | | | 428/685 |
| 2008/0093350 A1 * | 4/2008 | Ma | ..................... | B23K 35/0227 |
| | | | | 427/446 |
| 2008/0257870 A1 | 10/2008 | Longfield | | |
| 2010/0307838 A1 | 12/2010 | Stevens | | |
| 2012/0125900 A1 * | 5/2012 | Matsumoto | ............. | C22C 21/02 |
| | | | | 219/121.64 |
| 2012/0234814 A1 * | 9/2012 | Tseng | .................... | B23K 35/025 |
| | | | | 219/145.22 |
| 2012/0241432 A1 * | 9/2012 | Lin | .................. | B23K 35/3605 |
| | | | | 219/145.22 |
| 2012/0241433 A1 * | 9/2012 | Kojima | ................. | B23K 35/30 |
| | | | | 219/145.22 |
| 2013/0092674 A1 * | 4/2013 | Gerth | ................. | B23K 35/406 |
| | | | | 219/145.21 |
| 2013/0153557 A1 | 6/2013 | Pagano | | |
| 2013/0233839 A1 | 9/2013 | Barhorst | | |
| 2013/0270244 A1 | 10/2013 | Barhorst | | |
| 2013/0270248 A1 | 10/2013 | Barhorst | | |
| 2013/0294819 A1 * | 11/2013 | Menon | .................... | C22C 38/24 |
| | | | | 403/270 |
| 2013/0313240 A1 | 11/2013 | Amata | | |
| 2014/0027426 A1 | 1/2014 | Hutchison | | |
| 2014/0042212 A1 | 2/2014 | Shearer | | |
| 2014/0054019 A1 | 2/2014 | Wittebrood | | |
| 2014/0061166 A1 | 3/2014 | Barhorst | | |
| 2014/0061175 A1 | 3/2014 | Barhorst | | |
| 2014/0061179 A1 * | 3/2014 | Barhorst | ............ | B23K 35/3601 |
| | | | | 219/145.22 |
| 2014/0083981 A1 | 3/2014 | Amata | | |
| 2014/0097168 A1 * | 4/2014 | Ferree | ..................... | C22C 38/02 |
| | | | | 219/145.22 |
| 2014/0138366 A1 * | 5/2014 | Zhang | .................... | B23K 35/22 |
| | | | | 219/137 WM |
| 2014/0263194 A1 * | 9/2014 | Narayanan | ......... | B23K 35/0272 |
| | | | | 219/76.1 |
| 2014/0349136 A1 * | 11/2014 | Barhorst | ................ | B23K 35/00 |
| | | | | 428/684 |
| 2014/0353288 A1 * | 12/2014 | Amata | ................. | B23K 35/286 |
| | | | | 219/74 |
| 2015/0021815 A1 | 1/2015 | Albrecht | | |
| 2015/0099140 A1 * | 4/2015 | Amata | ............... | B23K 35/3602 |
| | | | | 428/659 |
| 2015/0159083 A1 * | 6/2015 | Jun | ....................... | B82Y 30/00 |
| | | | | 252/519.4 |
| 2015/0360327 A1 * | 12/2015 | Nakamura | ......... | B23K 35/3066 |
| | | | | 403/272 |
| 2016/0082541 A1 | 3/2016 | Barhorst | | |
| 2016/0107270 A1 | 4/2016 | Barhorst | | |
| 2018/0214991 A1 | 8/2018 | Yahata | | |
| 2019/0030652 A1 | 1/2019 | Barhorst | | |
| 2019/0099844 A1 * | 4/2019 | Zhang | ................. | B23K 35/368 |

(56) References Cited

U.S. PATENT DOCUMENTS

2019/0210162 A1\* 7/2019 Berube .................. C22C 21/08
2019/0299339 A1\* 10/2019 Barhorst ............... H01M 50/00

FOREIGN PATENT DOCUMENTS

| CN | 102225496 | 10/2011 |
|----|-----------|---------|
| CN | 102500958 | 6/2012 |
| CN | 102935562 | 2/2013 |
| CN | 103521943 | 1/2014 |
| CN | 103551757 | 2/2014 |
| CN | 103949795 | 7/2014 |
| CN | 104191111 | 12/2014 |
| CN | 104245208 | 12/2014 |
| CN | 108796251 | 11/2018 |
| EP | 0987339 | 3/2000 |
| EP | 987339 | 3/2000 |
| EP | 2913141 | 9/2015 |
| GB | 1383304 | 2/1974 |
| WO | 2014130452 | 8/2014 |
| WO | 2016137570 | 9/2016 |
| WO | 2016145382 | 9/2016 |

OTHER PUBLICATIONS

Osterman, Virginia, et al., ed; "Critical Melting Points and Reference Data for Vacuum Heat Treating," Vacuum Furnace Reference Series 1, Solar Atmospheres Inc., Sep. 2010.

\* cited by examiner ical properties from the corresponding bulk material have been in use in a wide variety of manufacturing applications to improve the mechanical properties such as Young's modulus, tensile strength, hardness, and fatigue strength.

ALUMINUM METAL-CORED WELDING WIRE

CROSS-REFERENCE TO RELATED APPLICATIONS

This application is continuation-in-part of U.S. application Ser. No. 14/839,406, filed Aug. 28, 2015, entitled "ALUMINUM METAL-CORED WELDING WIRE," which claims priority from and the benefit of U.S. Provisional Application Ser. No. 62/120,752, filed Feb. 25, 2015, entitled "ALUMINUM METAL-CORED WELDING WIRE," the disclosure of each of which is hereby incorporated by reference in its entirety for all purposes.

BACKGROUND

The present disclosure relates to a metal-cored welding wire, and, more specifically, to a metal-cored aluminum welding wire for arc welding, such as Gas Metal Arc Welding (GMAW) and Gas Tungsten Arc Welding (GTAW).

Aluminum and aluminum alloys are widely used as construction material due to their relatively low density and high corrosion resistance compared to other metals. For example, aluminum alloys may provide strengths between approximately 50 megapascal (MPa) and approximately 700 megapascal (MPa). For construction applications, aluminum materials are typically joined by means of welding. Since aluminum has a high affinity for oxygen, aluminum welding typically involves the use of an inert shielding gas to limit or prevent the formation of aluminum oxide (alumina) and undesirable inclusions.

Typical aluminum welding wires are solid wires. These solid wires are generally produced by continuously casting and subsequent rolling an alloy to form a rod having a predetermined diameter. The resulting rod may then be drawn through a number of dies to reduce the diameter and form an aluminum welding wire of the desired size. Since the composition of an aluminum welding wire is generally selected to closely match the composition of the workpiece, producing certain aluminum welding wires in this way can be problematic for certain alloys of aluminum that are not well-suited for drawing.

One problem in aluminum welding is weld porosity. It is generally desirable for welds to have a low porosity, and the porosity observed in aluminum welds may be caused by a number of sources. One prominent source of such pores is hydrogen that is released from, and forms voids within, the solidifying weld metal. Hydrogen gas may be formed via the decomposition of hydrogen-containing materials (e.g., moisture or organic materials, such as lubricants) near the welding arc. As such, it is desirable to prevent hydrogen-containing materials from being introduced into the welding environment.

Alloys reinforced by nanoparticles have gained interest in recent years due to the novel physical and chemical properties that such alloys often have. Nanoparticles may exhibit physical and chemical properties that differ from the corresponding microparticles and bulk materials, providing more effective options for many applications in various fields. For example, nanoparticles can be used in surface engineering to improve the abrasive wear resistance or to affect the tribological properties of lubricants; in electronic applications to change such properties as electrical conductivity, strength, and magnetic properties; and in welding or additive manufacturing applications to improve the mechanical properties such as Young's modulus, tensile strength, hardness, and fatigue strength.

BRIEF DESCRIPTION

In an embodiment, a metal-cored aluminum welding wire includes a metallic sheath and a granular core disposed within the metallic sheath. The granular core includes a first alloy having a plurality of elements, wherein the first alloy has a solidus that is lower than each of the respective melting points of the plurality of elements of the first alloy. The granular core includes aluminum metal matrix nano-composites (Al-MMNCs) that comprise an aluminum metal matrix and ceramic nanoparticles. The ceramic nanoparticles may have an average particle size of between 25 and 250 nm.

In an embodiment, a method of manufacturing a metal-cored aluminum welding wire includes disposing a granular core within a metallic sheath. The granular core includes Al-MMNCs that comprise an aluminum metal matrix and ceramic nanoparticles. The granular core includes a first alloy comprising a plurality of elements, wherein the first alloy has a solidus that is lower than each of the respective melting points of the plurality of elements of the first alloy.

In an embodiment, a method of welding includes forming a weld pool on a workpiece using a metal-cored aluminum welding wire, wherein the metal-cored aluminum welding wire comprises a granular core disposed within a metallic sheath. The granular core includes a first alloy comprising a plurality of elements, wherein the first alloy has a solidus that is lower than each of the respective melting points of the plurality of elements of the first alloy. The granular core includes Al-MMNCs that comprise an aluminum metal matrix and ceramic nanoparticles.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
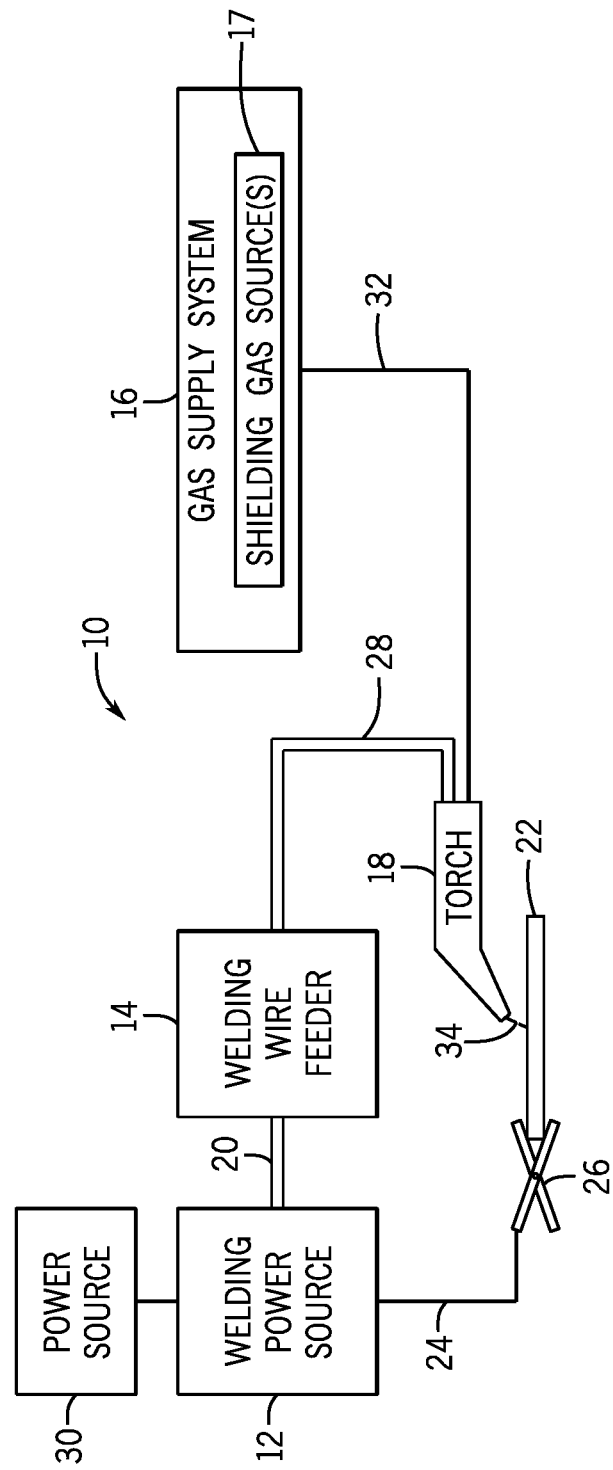
FIG. 1 is a schematic of an embodiment of a gas metal arc welding (GMAW) system that utilizes metal-cored aluminum welding wire, in accordance with the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, as used herein, "approximately" may generally refer to an approximate value that may, in certain embodiments, represent a difference (e.g., higher or lower) of less than 0.01%, less than 0.1%, or less than 1% from the actual value. That is, an "approximate" value may, in certain embodiments, be accurate to within (e.g., plus or minus) 0.01%, within 0.1%, or within 1% of the stated value Likewise, two values described as being "substantially the same" or "substantially similar" are approximately the same, and a material that is described as being "substantially free" of a substance includes approximately 0% of the substance. The terms "metal-core" and "metal-cored" are used herein to refer to tubular welding wires having a metallic sheath and a granular core, wherein the core primarily includes metallic alloying powders with low amounts (i.e., less than about 5 wt %) of non-metallic components (e.g., slag forming agents, metal oxides, stabilizers, etc.). For example, see ANSI/ANS A5.9 Specifications for Bare Stainless Steel Welding Electrodes and Rods. As used herein, the term "non-metallic component" refers to elements and compounds of elements that are not metals or metalloids (e.g., hydrogen, carbon, nitrogen, oxygen, phosphorous, sulfur, halides).

As used herein, "melting point" refers to the temperature or temperature range at which a solid substance is converted to a liquid. When the solid substance is a mixture, as in the case of alloys and mixtures of powders, the melting point usually encompasses a range of temperatures between a solidus and a liquidus, in which "solidus" refers to the temperature at which the mixture begins to melt, and "liquidus" refers to the temperature at which the mixture is completely liquefied. In contrast, pure solid substances tend to have a sharp, narrow melting point (i.e., the solidus and liquidus are substantially the same). One exceptional mixture, discussed in greater detail below, is a eutectic alloy. As used herein, a "eutectic alloy" refers to an alloy in which the solidus and liquidus are substantially the same, resulting in a sharp melting point at its eutectic temperature, which is lower than the melting points of the individual elements of the alloy. As such, it may be appreciated that the terms "solidus" and "melting point" are herein used interchangeably when referring to substances with sharp melting points, such as pure substances and eutectic alloys. As used herein, a "near-eutectic alloy" refers to an alloy that is made from the same elemental components as a eutectic alloy, albeit using slightly different relative amounts of these elements, to yield a slightly hypoeutectic or hypereutectic composition, wherein the liquidus and solidus differ from one another by less than approximately 20% (e.g., less than approximately 10%, less than approximately 5%).

Present embodiments are directed toward metal-cored aluminum welding wires. The disclosed metal-cored aluminum welding wires include a seamed or seamless aluminum or aluminum alloy sheath encircling a granular core, which is a compressed mixture of powdered metals, alloys, and/or non-metallic components. More specifically, as discussed in greater detail below, the disclosed metal-cored aluminum welding wire embodiments include a core that at least partially melts at a relatively low temperature, which prevents a portion of the powdered core from being carried away by the shielding gas, thereby improving the deposition rate of the welding wire. Accordingly, for the metal-cored aluminum welding wire embodiments discussed below, the core includes at least one alloy having a low melting point, relative to the melting points of the individual elements of the alloy, relative to the melting points of other components of the core, relative to the melting point of the sheath, or a combination thereof.

For example, for the metal-cored aluminum welding wire embodiments discussed below, one or more alloying elements are present within the core as an alloy (e.g., eutectic alloy or near-eutectic alloy) having a melting point (or solidus) that is substantially lower than the melting points of the individual elements of the alloy. In certain embodiments, the core of the metal-cored aluminum welding wire may include at least one alloy having a melting point (or solidus) that is substantially lower than the melting points (or solidi) of other powdered metallic components of the core. In certain embodiments, the composition of the core may be such that there is a substantial difference between the temperature at which the core begins to melt (i.e., the solidus of the core) and the temperature at which the sheath begins to melt (i.e., the solidus of the sheath). As discussed below, the presently disclosed metal-cored aluminum welding wires enable the production of low-porosity and high-strength welds at a high deposition rate. Further, the disclosed metal-cored aluminum welding wire enables significantly more flexibility on batch quantities, allowing for the on-demand production of limited numbers of specialized wires whose chemistries are precisely tuned to match the compositions of particular workpieces. Further, in contrast with solid aluminum welding wires, the composition of the disclosed metal-cored aluminum welding wire does not significantly impact the ability to manufacture the wire.

FIG. 1 illustrates an embodiment of a gas metal arc welding (GMAW) system 10 that utilizes metal-cored aluminum welding wire, in accordance with the present disclosure. It should be appreciated that, while the present discussion may focus specifically on the GMAW system 10 illustrated in FIG. 1, the presently disclosed welding wire may be used with other welding processes, particularly GTAW and tungsten inert gas (TIG) welding. The illustrated GMAW welding system 10 includes a welding power source 12, a welding wire feeder 14, a gas supply system 16, and a welding torch 18. The welding power source 12 generally supplies power to the welding system 10 and may be coupled to the welding wire feeder 14 via a cable bundle 20. The welding power source 12 may also be coupled to a workpiece 22 using a lead cable 24 having a clamp 26. In the illustrated embodiment, the welding wire feeder 14 is coupled to the welding torch 18 via a cable bundle 28 in order to supply consumable, tubular welding wire (e.g., metal-cored aluminum welding wire) and power to the welding torch 18 during operation of the welding system 10. In another embodiment, the welding power source 12 may couple and directly supply power to the welding torch 18.

The welding power source 12 may generally include power conversion circuitry that receives input power from an alternating current power source 30 (e.g., an AC power grid, an engine/generator set, or a combination thereof), conditions the input power, and provides DC or AC output power via the cable 20. For example, in certain embodiments, the power source 30 may be a constant voltage (CV) power source 30. The welding power source 12 may power the welding wire feeder 14 that, in turn, powers the welding torch 18, in accordance with demands of the welding system 10. The lead cable 24 terminating in the clamp 26 couples the welding power source 12 to the workpiece 22 to close the circuit between the welding power source 12, the workpiece 22, and the welding torch 18. The welding power source 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In another embodiment, the gas supply system 16 may instead be coupled to the wire feeder 14, and the wire feeder 14 may regulate the flow of gas from the gas supply system 16 to the welding torch 18. Shielding gas, as used herein, may refer to any inert gas or mixture of inert gases that may be provided to the arc and/or weld pool in order to provide a substantially inert local atmosphere (e.g., substantially free of oxygen) near the weld pool. In certain embodiments, the shielding gas flow may be a shielding gas or shielding gas mixture (e.g., argon (Ar), helium (He), nitrogen ($N_2$), similar suitable shielding gases, or any mixtures thereof). For example, a shielding gas flow (e.g., delivered via the gas conduit 32) may be 100% Ar or 100% He. In certain embodiments, the shielding gas flow may be an Ar/He mixture (e.g., 50% Ar/50% He; 25% Ar/75% He), which is presently recognized to enable better weld quality than pure Ar or pure He alone when used in combination with embodiments of the disclosed metal-cored aluminum welding wires.

Accordingly, the illustrated welding torch 18 generally receives the metal-cored aluminum welding wire from the welding wire feeder 14, power from the welding power source 12, and a shielding gas flow from the gas supply system 16 in order to perform GMAW of the workpiece 22. In certain embodiments, the welding wire feeder 14 may be a constant speed welding wire feeder 14. During operation, the welding torch 18 may be brought near the workpiece 22 so that an arc 34 may be formed between the consumable welding electrode (i.e., the welding wire exiting a contact tip of the welding torch 18) and the workpiece 22. Additionally, as discussed below, by controlling the composition of the metal-cored aluminum welding wire, the chemical and mechanical properties of the resulting weld may be varied.

It may be noted that GTAW (TIG) systems are similar to the welding system illustrated in FIG. 1 and are particularly well-suited for use with the disclosed metal-cored aluminum welding wires. GTAW systems generally include a welding torch that has a non-consumable (e.g., tungsten) welding electrode. The welding torch of the GTAW system receives power from a welding power source, which is applied to the electrode to ionize a gas flow (e.g., an argon gas flow) from a gas supply system and establish an arc near a workpiece. As such, the GTAW lacks the welding wire feeder 14, and instead, the disclosed metal-cored aluminum welding wire is generally hand-fed into the welding arc by the welding operator.

Aluminum alloys are generally classified into wrought alloys and cast alloys, and sub-classified into hardenable (e.g., heat-treatable) and non-hardenable (e.g., non-heat-treatable) materials. The most common alloying elements for aluminum alloys include: magnesium (Mg, melting point (MP)=1202° F.), manganese (Mn, MP=2275° F.), copper (Cu, MP=1981° F.), silicon (Si, MP=2570° F.), iron (Fe, MP=2795° F.), titanium (Ti, MP=3034° F.), chromium (Cr, MP=3465° F.), nickel (Ni, MP=2647° F.), zinc (Zn, MP=788° F.), vanadium (V, MP=3434° F.), zirconium (Zr, MP=3366° F.), silver (Ag, MP=1764° F.), cadmium (Ni, MP=610° F.), lithium (Li, MP=358° F.), scandium (Sc, MP=2802° F.), lead (Pb, MP=622° F.), bismuth (Bi, MP=520° F.), tin (Sn, MP=450° F.), boron (B, MP=3767° F.), and beryllium (Be, MP=2349° F.). Pure aluminum has a melting point of approximately 1220° F., and low-alloy aluminum (e.g., 1xxx series aluminum alloy) can have a melting point that approaches 1215° F. As discussed in detail below, various alloying elements in various ranges can increase or decrease the melting point (e.g., the solidus and/or liquidus) of an alloy in different ways.

Figure 2B:
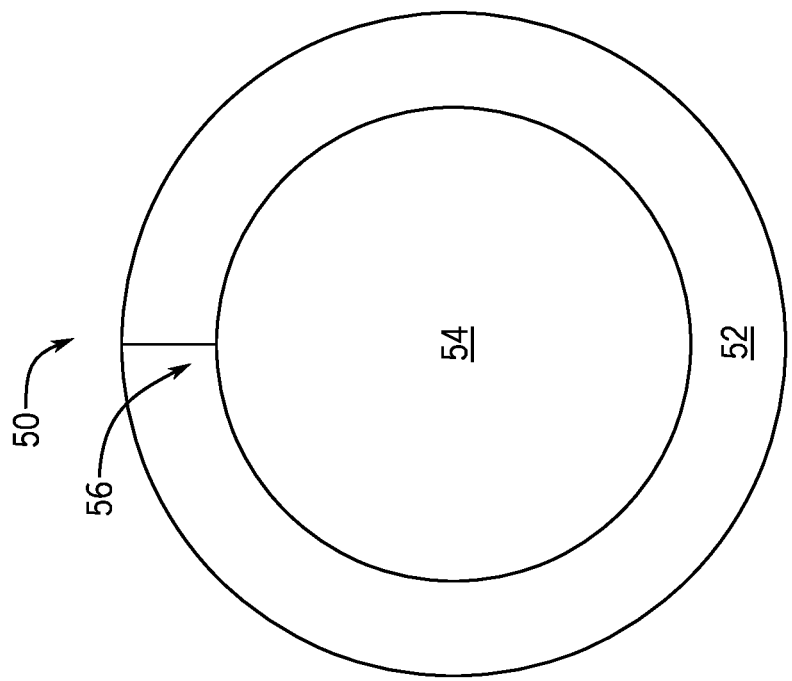
FIG. 2B is a cross-sectional schematic of a metal-cored aluminum welding wire that includes a seam, in accordance with embodiments of the present technique.
Figure 2A:
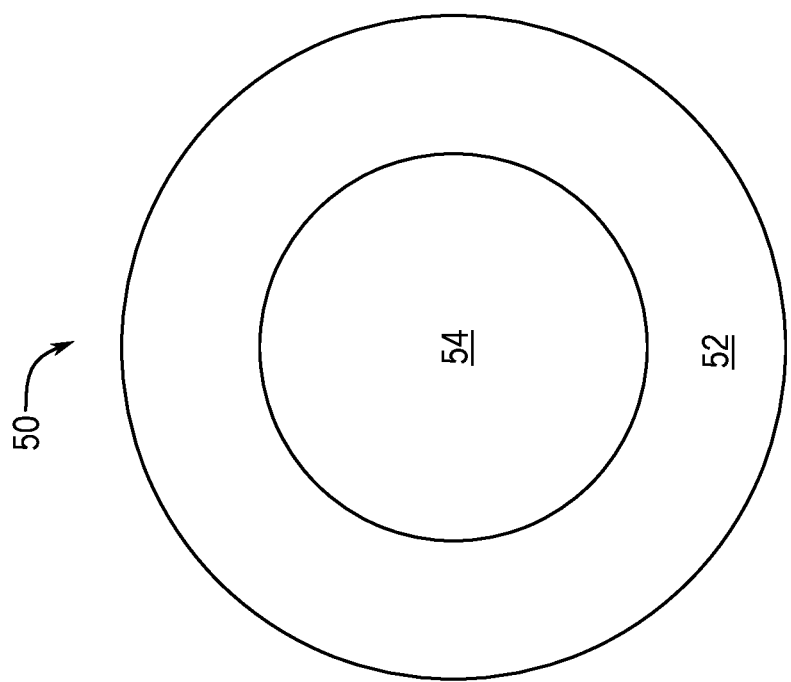
FIG. 2A is a cross-sectional schematic of a seamless metal-cored aluminum welding wire, in accordance with embodiments of the present technique.

With the foregoing in mind, FIGS. 2A and 2B illustrate schematic, cross-sectional views of different embodiments of a metal-cored aluminum welding wire 50. The metal-cored aluminum welding wire 50 illustrated in FIG. 2A includes a seamless, metallic sheath 52 that encircles (e.g., surrounds, contains) a compressed granular core 54. In contrast, the metal-cored aluminum welding wire 50 illustrated in FIG. 2B includes a metallic sheath 52 that encircles (e.g., surrounds, contains) a compressed granular core 54, and further includes a seam 56 (e.g., a flush seam or a folded/bent seam) where the edges of the metal strip used to manufacture the sheath 52 meet. As discussed below, embodiments of the metal-cored aluminum welding wire 50 that lack a seam 56 may enable advantages in terms of reduced weld porosity.

In certain embodiments, the core 54 may account for less than approximately 20% (e.g., less than approximately 15%, less than approximately 10%, less than approximately 5%) of the weight of the wire 50, and approximately 80% or more of the weight of the wire 50 may be contributed by the sheath 52. This relatively low-fill design generally enables operators to more easily substitute solid-core aluminum welding wires used in existing welding operations with the disclosed metal-cored aluminum welding wire 50, since the welding wire 50 will behave in a similar manner while enabling the production of higher alloy weld deposits than is practical for a solid aluminum welding wire. It may be appreciated that the overall composition of a metal-cored aluminum welding wire 50 may be generally tuned to match the composition of a particular workpiece 22. Furthermore, the overall composition of the metal-cored aluminum welding wire 50 can be determined based on the composition of the sheath 52, the contribution of the sheath 52 to the total weight of the wire 50, the composition of the core 54, and the contribution of the core 54 to the total weight of the wire 50.

As discussed above, aluminum welding operations (e.g., GMAW, GTAW) typically involve the use of a shielding gas to reduce oxygen and moisture content near the weld pool. Since the shielding gas may have a relatively high flow rate, it is presently recognized that a portion of the powdered core 54 of a metal-cored aluminum welding wire 50 can be carried away from the surface of the workpiece by the shielding gas. For example, when certain alloying elements are included in the core as pure elemental powders (e.g., Mn, Ti, Si), the high melting point of these elemental powders can result in at least a portion of the powders being carried away by the shielding gas such that they do not melt to become incorporated into the weld deposit. This can undesirably reduce the deposition rate of the welding wire, alter the composition of the weld deposit, and increase the amount of particulates in the welding environment.

As such, for the disclosed metal-cored aluminum welding wire 50, at least one metallic component within the core 54 of the welding wire 50 is an alloy having a substantially lower melting point (or solidus) than the melting point of the pure elements that make up the alloy. Additionally, in certain embodiments, at least one metallic component in the core 54 of the welding wire 50 has a melting point (or solidus) that is substantially lower than the melting point (or solidus) of other powdered components of the core 54. For such embodiments, it is believed that these lower melting components of the core 54 are the first to melt as the temperature of the wire 50 increases, and the higher melting powders are contained within (e.g., surrounded, captured, or trapped by) the liquefied lower melting components and are not easily carried away by the shielding gas flow. Additionally or alternatively, in certain embodiments, the core 54 of the metal-cored aluminum welding wire 50 has a substantially lower melting point (or solidus) relative to the melting point (or solidus) of the sheath 52. For such embodiments, the core 54 includes one or more powdered components that begin to melt at a lower temperature than the sheath 52. For such embodiments, it is believed that the relatively higher melting point (or solidus) of the sheath 52 enables the sheath 52 to remain intact to provide a path for current to flow until the core 54 is partially or completely liquefied at or near the welding arc 34.

With the foregoing in mind, specific considerations for the sheath 52 and the core 54 for embodiments of the metal-cored aluminum welding wire 50 are set forth below. For embodiments of the disclosed metal-cored aluminum welding wire 50, the metallic sheath 52 is formed from any suitable aluminum alloy. For example, in certain embodiments, the sheath 52 may be made of low-alloy aluminum (e.g., Al 1100, pure aluminum), or other aluminum alloys (e.g., Al 6005, Al 6061). By specific example, in certain embodiments, the sheath 52 may be made from a 6xxx series aluminum alloy (e.g., Al 6063), which may have a melting point of approximately 1080° F. (solidus) to approximately 1210° F. (liquidus). In other embodiments, the sheath 52 may be made from a lower-alloy aluminum, such as a 1xxx series aluminum alloy (e.g., Al 1100), which enables a higher melting point (e.g., between a solidus of approximately 1190° F. and a liquidus of approximately 1215° F.) and easier extrusion. In certain other embodiments, the sheath 62 may be made from a 4xxx series aluminum alloy (e.g., Al 4043), which may have a melting point of approximately 1065° F. (solidus) to approximately 1170° F. (liquidus); or a 5xxx series aluminum alloy (e.g., Al 5052), which may have a melting point of approximately 1125° F. (solidus) to approximately 1200° F. (liquidus).

As mentioned above with respect to FIG. 2A, in certain embodiments, the sheath 52 of the disclosed metal-cored aluminum welding wires 50 may lack a seam or similar discontinuity. In other embodiments, the metal-cored aluminum welding wires 50 may be fabricated by bending and compressing a metal strip to form the sheath 52 around the granular core material 54, resulting in a seam 56 (e.g., a flush seam or a folded/bent seam) along the sheath 52 of the welding wire, as illustrated in FIG. 2B. Embodiments having a seamless sheath 52, as illustrated in FIG. 2A, may be formed from a seamless, extruded tube of aluminum or aluminum alloy. By using a seamless sheath 52, certain disclosed embodiments of the metal-cored aluminum welding wire 50 are less likely to retain organic residue (e.g., lubricants) from the fabrication process, and less likely to absorb moisture from the environment, than embodiments that include a seam 56. As such, the disclosed embodiments of the seamless metal-cored aluminum welding wire 50, as illustrated in FIG. 2A, reduce the delivery of such hydrogen-containing materials to the weld pool, thereby reducing the aforementioned issues of hydrogen-induced porosity in the resulting weld deposit.

As mentioned above, the granular core 54 of the disclosed metal-cored aluminum welding wire 50 is generally a compressed, homogenous mixture of powders, including one or more powdered metallic components. In certain embodiments, the core 54 may also include up to approximately 5% of non-metals components (e.g., fluxing components, slagging components, components to control surface tension, arc stability components, components to control weld pool viscosity, exothermic elements or compounds capable of increasing the weld temperature, etc.). For example, in certain embodiments, the core 54 may include oxides (e.g., oxides of metals or metal alloys). By further example, in certain embodiments, the core 54 may include barium (Ba) to reduce weld porosity. Additionally, as mentioned, it is generally desirable for the core 54 to be substantially free of moisture, organic lubricants, or other sources of diffusible hydrogen.

The powdered metallic components of the core 54 of the disclosed metal-cored aluminum welding wire 50 may be either pure metal powders, or powders of alloys. For example, in certain embodiments, the powdered alloys of the core 54 may be binary alloys (i.e., made of two elements), ternary alloys (i.e., made of three elements), or quaternary alloys (i.e., made of four elements). For example, it may be appreciated that, in different embodiments, three alloying elements of the welding wire 50 (e.g., Al, Mg, and Mn) may be included in the core 54 in different ways (e.g., as a mixture of pure Al, pure Mg, and pure Mn; as a mixture of an Al—Mg alloy and pure Mn; as an Al—Mg—Mn alloy; as a mixture of an Al—Mg alloy and an Al—Mg—Mn alloy), which may be optimized for desired weld deposit characteristics and to minimize the amount of powdered core 54 in the welding wire 50.

Additionally, as mentioned above, the one or more powdered metallic components include at least one alloy having a substantially lower melting point (or solidus) than the melting point of the individual elements of that alloy. For example, in certain embodiments, the alloy may be a eutectic or near-eutectic alloy. A eutectic alloy is an alloy that includes two or more elements having particular relative concentrations that define a eutectic composition. When only two elements are present within a eutectic alloy, it is described as a binary eutectic system; however, systems with a greater number of elements (e.g., ternary systems, quaternary systems, etc.) are also possible. A eutectic alloy has a sharp melting point (i.e., solidus and liquidus are substantially the same) at its eutectic temperature, which is necessarily lower than each of the melting points of the individual elements that make up the alloy. It may be appreciated that not every set of elements has a eutectic composition, for example, aluminum-titanium alloys and aluminum-manganese alloys do not have a eutectic composition. Furthermore, polyeutectic systems with multiple eutectic compositions for a given set of elements are possible as well. Regardless, for a set of elements that has at least one eutectic composition, the lowest eutectic temperature represents the lowest possible melting point of the alloys that can be made from the set of elements.

In certain embodiments, the core 54 of the metal-cored aluminum welding wire 50 may include one or more binary eutectic alloys. More specifically, in certain embodiments, one or more of the binary eutectic alloys of the core 54 may be aluminum binary eutectic alloys. A non-limiting list of example aluminum binary eutectics includes: aluminum-beryllium (0.8% Be; melting point (MP)=1191° F.), aluminum-copper (33% Cu; MP=1019° F.), aluminum-iron (98% Fe; MP=1211° F.), aluminum-lithium (93% Li; MP=351° F.), aluminum-magnesium (36% Mg, MP=844° F.; and an even lower melting eutectic at 66% Mg; MP=819° F.), aluminum-silicon (12.6% Si; MP=1071° F.), and aluminum-zinc (94% zinc; MP=718° F.). In certain embodiments, ternary or quaternary eutectics of aluminum may be included in the core 54. In certain embodiments, eutectics of non-aluminum alloys may be included in the core 54. A non-limiting list of example includes titanium-boron, titanium-zirconium and zirconium-vanadium. In certain embodiments, the core 54 may be composed entirely of one or more eutectic alloys.

Additionally, in certain embodiments, the core 54 includes one or more powdered components that begin to melt at a lower temperature than the sheath 52 as the temperature of the metal-cored welding wire 50 increases at or near the welding arc 34. For example, in certain embodiments, the melting point (or solidus) of the sheath 52 may be at least 5% greater, at least 10% greater, at least 15% greater, at least 25% greater, at least 30% greater, at least 50% greater, or at least 70% greater than the melting point (or solidus) of the core 54. By specific example, in an embodiment, a welding wire 50 may have a sheath 52 made from a low-alloy aluminum alloy with a solidus of approximately 1190° F. and a core 54 that includes an aluminum-magnesium alloy with a melting point of approximately 819° F., such that the sheath 52 of the wire 50 has a solidus that is approximately 30% greater than the solidus of the granular core 54.

In certain embodiments of the metal cored aluminum welding wire 50, the core 54 may include a mixture of metallic components, wherein at least one powdered metallic component has a melting point (or solidus) that is substantially lower than the melting points (or solidi) of other powdered metallic components of the core 54. For example, in certain embodiments, each metallic component of the core 54 may be classified as either high-melting (e.g., melting point or solidi greater than 1000° F.) or low-melting (e.g., melting points or solidi less than 1000° F.) components. For such embodiments, it may be desirable to have a sufficient amount of lower melting metallic components in the core 54 such that, when these metallic components melt and liquefy, there is a sufficient volume of these liquefied metallic components to contain (e.g., suspend, surround) the powders of the higher melting components of the core 54. For example, in certain embodiments, one or more lower melting components of the core 54 may account for greater than approximately 15%, greater than approximately 25%, greater than approximately 40%, or greater than approximately 60% of the core 54 by weight. It may be noted that, in certain embodiments, one or more higher melting components of the core 54 may only partially melt or dissolve before becoming incorporated into the weld deposit.

In certain embodiments, each metallic component of the core 54 (e.g., aluminum-magnesium alloy, aluminum-silicon alloy) may be produced by homogenously melting the elements of the metallic component in the desired ratios to form a melt. The solidified melt may subsequently be milled, and the resulting powder may be sieved and fractioned. It is presently recognized that metallic powders produced in this manner have a lower oxygen content than powders produced by other methods (e.g., water or gas atomized powders), and, therefore, produce less alumina during welding. In certain embodiments, the milled powders may have a grain size less than approximately 0.4 mm (e.g., approximately 45 µm to approximately 250 µm) to facilitate tight packing within the core 54. It may be noted that, while increasing grain size of the particles may also reduce the amount of the granular core 54 that can be carried away by the shielding gas, too large of a grain size can result in poor packing (e.g., excess void space) and undesired gas trapping within the core 54. In addition, in certain embodiments, the milled powders may have grain sizes less than 1 µm (as discussed in further detail below regarding aluminum metal matrix nano-composites). After preparing each of the powdered components of the core 54, the metallic components, as well as any non-metallic components, may be combined and mixed to form a substantially homogenous mixture of the powdered components of the core 54.

As set forth above, in certain embodiments, the sheath 52 may be a seamless sheath that is formed from an extruded aluminum alloy. After cleaning an extruded aluminum tube to remove surface contaminates, the aforementioned homogenous mixture of the powdered components of the core 54 may be added to the seamless sheath 52, for example, using vibration filling. The filled sheath 52 may be subsequently drawn to a smaller diameter, wherein drawing both hardens the seamless sheath 52 and compresses the powdered components of the core 54. The filled sheath 52 also may, additionally or alternatively, be shaved to reduce the thickness of the sheath 52 and the diameter of the wire 50, as well as to provide a clean (e.g., oxide-free) surface to the wire 50. In certain embodiments, the wire 50 may, additionally or alternatively, be dried at a temperature less than the solidus of the core 54, to ensure that the wire 50 is substantially free of moisture. In certain embodiments, the wire 50 may be soft annealed at a temperature less than the solidus of the core 54, which improves or increases the ductility of the wire 50. In certain embodiments, the wire 50 may be drawn to a final desired diameter and, subsequently, drawing lubricants and/or oxide layers may be removed from the surface of the seamless sheath 52.

It may also be noted that the disclosed aluminum metal-cored welding wire design enables the formulations of weld deposits to be modified for enhanced properties. For example, the disclosed aluminum metal-cored welding wire 50 enables the production of a binary weld deposit that includes Al and Si. However, the formulation of this example aluminum metal-cored welding wire 50 may also be modified with the addition of a third alloying element, such as Mg, in a suitable quantity to render the weld deposit heat-treatable. As such, the aluminum metal-cored welding wire 50 enables greater flexibility that can enable enhanced properties into a weld deposit with minor variations in the composition of the core 54 and/or wire 50.

EXAMPLE 1

Table 1 describes a target composition for a weld deposit (i.e., Al 357 alloy weld deposit) capable of being formed using an embodiment of the metal-cored aluminum welding wire 50 in a GMAW or GTAW operation. It may be appreciated that elements indicated by maximum values alone are not required to be present by the specification; however, the indicated maximum values should be respected in this example.

TABLE 1

Desired weld deposit composition and melting points for each of the alloying elements for example 1.

| Element | wt % | Melting Point (° F.) |
|---|---|---|
| Si | 6.5-7.5 | 2570 |
| Fe | 0.15 max | 2795 |
| Cu | 0.05 max | 1981 |
| Mn | 0.03 max | 2275 |
| Mg | 0.45-0.6 | 1202 |
| Zn | 0.05 max | 788 |
| Ti | 0.20 max | 3038 |
| Others (each) | 0.05 max | |
| Others (total) | 0.15 max | |
| Al | remainder | 1220 |

Table 2 includes the composition of the sheath 52, the core 54, and the total wire 50 for an embodiment of the metal-cored aluminum welding wire 50 capable of providing the weld deposit chemistry set forth above with respect to Table 1. For the example welding wire 50 represented in Table 2, the sheath 52 is an Al 6063 seamed or seamless sheath having the indicated composition. The core 54 of the example welding wire 50 is a mixture of three different powders, two of which (i.e., Al—Si and Al—Mg) are alloys having substantially lower melting points than the melting points of the individual elements of the respective alloys (i.e., Al, Si, and Mg). Additionally, for the example welding wire 50, the Al—Mg alloy is a eutectic alloy having the lowest possible melting point of all Al—Mg alloys. Also, for the example welding wire 50, the Al—Si alloy has a substantially lower melting point than the pure Ti powder of the core 54 and is present in suitable quantities to liquefy and surround (e.g., trap, capture) the powdered Ti component of the core 54, as discussed above. Furthermore, the melting point of the sheath 52, namely 1140° F. (solidus)-1210° F. (liquidus), is substantially greater than the solidus of the core 54, namely 819° F.

TABLE 2

Breakdown of the composition and contribution of the sheath 52 and the core 54 of the example embodiment of the metal-cored aluminum welding wire 50 for example 1, with the remaining elemental composition of the wire being aluminum and trace elements.

| | Sheath (Al 6063) | | Core | | | | | Total |
|---|---|---|---|---|---|---|---|---|
| | wt % in Sheath | Portion of Wire that is Sheath (wt %) | Elemental Contribution to Wire (wt %) | Alloy in Core | Melting Point of Alloy (° F.) | wt % Element in Alloy | wt % Alloy in Wire | Elemental Contribution to Wire (wt %) | Elemental Composition of Wire (wt %) |
| Si | 0.55 | 86.0 | 0.47 | Al-Si | 1868 | 50 | 13.80 | 6.9 | 7.37 |
| Mg | 0.6 | | 0.52 | Al-Mg | 819 | 66 | 0.10 | 0.066 | 0.58 |
| Ti | 0.05 | | 0.04 | Ti | 3038 | 100 | 0.10 | 0.1 | 0.14 |

EXAMPLE 2

Table 3 describes another target composition of a weld deposit capable of being formed using another embodiment of the metal-cored aluminum welding wire 50 in a GMAW or GTAW operation. It may be appreciated that elements indicated by maximum values alone are not required to be present by the specification; however, the indicated maximum values should be respected in this example. Compared to the target weld deposit of Table 1, the target weld composition set forth in Table 3 indicates a higher content of particular alloying elements, particularly Mg and Mn.

TABLE 3

Desired weld deposit composition and melting points for each of the alloying elements for example 2.

| Element | wt % | Melting Point (° F.) |
|---|---|---|
| Si | 0.6 max | 2570 |
| Fe | 0.4 max | 2795 |
| Cu | 0.1 max | 1981 |
| Mn | 0.9-1.5 | 2275 |
| Mg | 5.6-6.6 | 1202 |
| Cr | 0.05-0.20 | 3385 |
| Ti | 0.05-0.20 | 3038 |
| Be | 0.0003 max | 2349 |
| Al | remainder | 1220 |

It may be appreciated that the higher Mg and Mn content indicated in Table 3 may be useful to particular applications, for example, to enhance the strength of fillet welds. It may be useful to have the ability to raise Mn concentrations to maintain strength while lowering Mg content to improve the corrosion resistance of a weld in corrosive environments (e.g., marine environments), without being limited by solid wire manufacturing constraints associated with high Mn concentrations. The higher amounts of alloying elements set forth in Table 3 are more common among wrought aluminum alloys; however, it may be noted that even greater amounts of these alloying elements may be present in casting aluminum alloys. It should be noted that producing a solid-core aluminum welding wire capable of producing a weld deposit having the amounts of Mg and Mn indicated in Table 3, let alone even greater amounts, is impractical since processing (e.g., drawing, shaving, rolling) the solid wire during manufacturing becomes substantially more difficult with increasing content of these alloying elements. As such, embodiments of the disclosed metal-cored aluminum welding wire 50 enable the formation of high-alloy aluminum weld deposits, like the deposit indicated in Table 3, that are not possible or practical without the use of the metal-cored aluminum welding wire 50 described herein.

Table 4 includes the composition of the sheath 52, the core 54, and the total wire 50 for an embodiment of the metal-cored aluminum welding wire 50 capable of providing the weld deposit chemistry set forth above with respect to Table 3. For the example welding wire 50 represented in Table 4, the sheath 52 is an Al 6063 seamed or seamless sheath having the indicated composition. The core 54 of the example welding wire 50 is a mixture of four different powders, two of which (i.e., Al—Mg and Al—Mn) are alloys having substantially lower melting points than the melting points of the individual elements of the respective alloys (i.e., Al, Mg, and Mn). Additionally, for the example welding wire 50, the Al—Mg alloy is a eutectic alloy having the lowest possible melting point of all Al—Mg alloys. Also, for the example welding wire 50, the Al—Mg alloy has a substantially lower melting point than the other powdered components of the core 54, and it present in suitable quantities to liquefy and surround (e.g., trap, capture) the higher-melting powdered components of the core 54, as discussed above. Furthermore, the melting point of the sheath 52, namely 1140° F. (solidus)-1210° F. (liquidus), is substantially greater than the solidus of the core 54, namely 819° F.

TABLE 4

Breakdown of the composition and contribution of the sheath 52 and the core 54 of the example embodiment of the metal-cored aluminum welding wire 50 for example 2, with the remaining elemental composition of the wire being aluminum and trace elements.

| | Sheath (Al 6063) | | | Core | | | | Total |
|---|---|---|---|---|---|---|---|---|
| | wt % in Sheath | Portion of Wire that is Sheath (wt %) | Elemental Contribution to Wire (wt %) | Alloy in Core | Melting Point of Alloy (° F.) | wt % Element in Alloy | wt % Alloy in Wire | Elemental Contribution to Wire (wt %) | Elemental Composition of Wire (wt %) |
| Si | 0.55 | 85.8 | 0.47 | — | — | — | — | — | 0.47 |
| Mg | 0.6 | | 0.51 | Al-Mg | 819 | 66 | 9.00 | 5.94 | 6.45 |
| Ti | 0.05 | | 0.04 | Ti | 3038 | 100 | 0.10 | 0.1 | 0.14 |
| Cr | 0.08 | | 0.07 | Cr | 3385 | 100 | 0.10 | 0.1 | 0.17 |
| Mn | — | | — | Al-Mn | 1652 | 25 | 5.00 | 1.25 | 1.25 |

EXAMPLE 3

Table 5 describes another target composition (similar to Al 7005, used for weldable aluminum extrusions) of a weld deposit capable of being formed using an embodiment of the metal-cored aluminum welding wire 50 in a GMAW or GTAW operation. It may be appreciated that elements indicated by maximum values alone are not required to be present by the specification; however, the indicated maximum values should be respected in this specific example.

TABLE 5

Desired weld deposit composition and melting points for each of the alloying elements for example 3.

| Element | wt % | Melting Point (° F.) |
|---|---|---|
| Si | 0.35 max | 2570 |
| Fe | 0.4 max | 2795 |
| Cu | 0.1 max | 1981 |
| Mn | 0.2-0.7 | 2275 |
| Mg | 1.0-1.8 | 1202 |
| Cr | 0.06-0.02 | 3385 |
| Zn | 4.0-5.0 | 788 |
| Ti | 0.01-0.06 | 3038 |

TABLE 5-continued

Desired weld deposit composition and melting points for each of the alloying elements for example 3.

| Element | wt % | Melting Point (° F.) |
|---|---|---|
| Be | 0.0003 max | 2349 |
| Zr | 0.08-0.20 | 3366 |
| Al | remainder | 1220 |

It may be appreciated that the higher alloying element content indicated in Table 5 may be useful to particular applications, for example, to provide a heat-treatable aluminum alloy having a composition similar to the Al 7005 alloy. It may also be appreciated that there is not a solid-core aluminum welding wire capable of producing the weld deposit chemistry of Table 5. Instead, in the absence of the embodiments of the present disclosure, workpieces having the composition indicated in Table 5 are typically welded using a common filler metal, the 5356 aluminum alloy, which is not heat-treatable. In contrast, embodiments of the disclosed metal-cored aluminum welding wire 50 enable the formation of high-alloy, heat treatable aluminum weld deposits, like the deposit indicated in Table 5, which are not possible or practical without the use of the metal-cored aluminum welding wire 50 described herein.

Table 6 includes the composition of the sheath 52, the core 54, and the total wire 50 for an embodiment of the metal-cored aluminum welding wire 50 capable of providing the weld deposit chemistry set forth above with respect to Table 5. For the example welding wire 50 represented in Table 6, the sheath 52 is an Al 1100 seamed or seamless sheath having the indicated composition. The core 54 of the example welding wire 50 is a mixture of six different powders, four of which (i.e., Al—Mn, Al—Mg, Al—Zn, and Ti—Zr) are alloys having substantially lower melting points than the melting points of the individual elements of the respective alloys (i.e., Al, Mn, Mg, Zn, Ti, and Zr). Additionally, for the example welding wire 50, the Al—Mg and Al—Zn alloys are eutectic alloys having the lowest possible melting points of all Al—Mg and Al—Zn alloys, respectively. Also, for the example welding wire 50, both the Al—Mg and Al—Zn alloys have substantially lower melting points than the other powdered components of the core 54, and are present in suitable quantities to melt before and surround (e.g., trap, capture) the higher-melting powdered components of the core 54, as discussed above. Furthermore, the melting point of the sheath 52, namely 1190° F. (solidus)-1215° F. (liquidus), is substantially greater than the solidus of the core 54, namely 718° F.

TABLE 6

Breakdown of the composition and contribution of the sheath 52 and the core 54 of the example embodiment of the metal-cored aluminum welding wire 50 for example 3, with the remaining elemental composition of the wire being aluminum and trace elements.

| | Sheath (Al 6063) | | Core | | | | | Total |
|---|---|---|---|---|---|---|---|---|
| | wt % in Sheath | Portion of Wire that is in Sheath (wt %) | Elemental Contribution to Wire (wt %) | Alloy in Core | Melting Point of Alloy (° F.) | wt % Element in Alloy | wt % Alloy in Wire | Elemental Contribution to Wire (wt %) | Elemental Composition of Wire (wt %) |
| Si | 0.3 | 87.86 | 0.26 | — | — | — | — | — | 0.26 |
| Fe | 0.3 | | 0.26 | — | — | — | — | — | 0.26 |
| Cu | 0.04 | | 0.04 | — | — | — | — | — | 0.04 |
| Mn | — | | — | Al-Mn | 1652 | 25 | 1.00 | 0.25 | 0.25 |
| Mg | — | | — | Al-Mg | 819 | 66 | 2.00 | 1.32 | 1.32 |
| Ti | — | | — | Ti | 3038 | 100 | 0.01 | 0.01 | 0.06 |
| | | | | Ti-Zr | ~1800 | 34.4 | 0.15 | 0.05 | |
| Cr | — | | — | Cr | 3385 | 100 | 0.10 | 0.10 | 0.10 |
| Zn | — | | — | Al-Zn | 718 | 94 | 5.00 | 4.70 | 4.70 |
| Zr | — | | — | Ti-Zr | ~1800 | 65.6 | 0.15 | 0.10 | 0.10 |

EXAMPLE 4

Table 7 describes another target composition of a weld deposit (Al 520.0, an aluminum casting alloy) capable of being formed using an embodiment of the metal-cored aluminum welding wire 50 in a GMAW or GTAW operation. It may be appreciated that elements indicated by maximum values alone are not required to be present by the specification; however, the indicated maximum values should be respected in this example.

TABLE 7

Desired weld deposit composition and melting points for each of the alloying elements for example 4.

| Element | wt % | Melting Point (° F.) |
|---|---|---|
| Si | 0.25 max | 2570 |
| Fe | 0.30 max | 2795 |
| Cu | 0.25 max | 1981 |
| Mn | 0.15 max | 2275 |
| Mg | 9.5-10.6 | 1202 |
| Zn | 0.15 max | 788 |
| Ti | 0.25 max | 3038 |
| Be | 0.0003 max | 2349 |
| Al | remainder | 1220 |

It may also be appreciated that there is not an Al 520.0 solid-core aluminum welding wire capable of producing the weld deposit chemistry of Table 7. Instead, in the absence of the embodiments of the present disclosure, workpieces having the composition indicated in Table 7 are typically welded using a common filler metal, the 5356 aluminum alloy. In contrast, embodiments of the disclosed metal-cored aluminum welding wire 50 enable the formation of high-alloy aluminum weld deposits, like the deposit indicated in Table 7, which are not possible or practical without the use of the metal-cored aluminum welding wire 50 described herein.

Table 8 includes the composition of the sheath 52, the core 54, and the total wire 50 for an embodiment of the metal-cored aluminum welding wire 50 capable of providing the weld deposit chemistry set forth above with respect to Table 7. For the example welding wire 50 represented in Table 8, the sheath 52 is an Al 1100 seamed or seamless sheath having the indicated composition. The core 54 of the example welding wire 50 is a single powdered alloy, Al—Mg, which is an alloy having a substantially lower melting point than the melting points of the individual elements of the alloys (i.e., Al and Mg). Additionally, for the example welding wire 50, the Al—Mg is a eutectic alloy having the lowest possible melting point of all Al—Mg alloys. Furthermore, the melting point of the sheath 52, namely 1190° F. (solidus)-1215° F. (liquidus), is substantially greater than the solidus of the core 54, namely 819° F.

TABLE 8

Breakdown of the composition and contribution of the sheath 52 and the core 54 of the example embodiment of the metal-cored aluminum welding wire 50 for example 4, with the remaining elemental composition of the wire being aluminum and trace elements.

| | Sheath (Al 6063) | | | Core | | | | Total |
|---|---|---|---|---|---|---|---|---|
| | wt % in Sheath | Portion of Wire that is in Sheath (wt %) | Elemental Contribution to Wire (wt %) | Alloy in Core | Melting Point of Alloy (° F.) | wt % Element in Alloy | wt % Alloy in Wire | Elemental Contribution to Wire (wt %) | Elemental Composition of Wire (wt %) |
| Si | 0.3 | 84.5 | 0.26 | — | — | — | — | — | 0.26 |
| Fe | 0.3 | | 0.26 | — | — | — | — | — | 0.26 |
| Cu | 0.04 | | 0.04 | — | — | — | — | — | 0.04 |
| Mg | — | | — | Al-Mg | 819 | 66 | 15.50 | 10.23 | 10.23 |

EXAMPLE 5

Table 9 describes another target composition of a weld deposit (based on Al 206.0, an aluminum structural casting alloy) capable of being formed using an embodiment of the metal-cored aluminum welding wire 50 in a GMAW or GTAW operation. It may be appreciated that elements indicated by maximum values alone are not required to be present by the specification; however, the indicated maximum values should be respected in this example.

TABLE 9

Desired weld deposit composition and melting points for each of the alloying elements for example 5.

| Element | wt % | Melting Point (° F.) |
|---|---|---|
| Si | 0.1 max | 2570 |
| Fe | 0.15 max | 2795 |
| Cu | 4.2-5.0 | 1981 |
| Mn | 0.2-0.5 | 2275 |
| Mg | 0.15-0.35 | 1202 |
| Ti | 0.15-0.3 | 3038 |
| Zn | 0.1 max | 788 |
| Al | remainder | 1220 |

Aluminum alloy 206.0 is commonly used for structural castings in heat treated temper for automotive, aerospace, and other applications where high tensile strength, high yield strength, moderate elongation, and high fracture toughness are desired. Examples of parts that can be made using alloy 206.0 include gear housings and truck spring hanger castings. As discussed above, it would be desirable to use an alloy 206.0 welding wire to weld such parts in order to match the composition of the workpiece. However, the lack of availability of a solid alloy 206.0 welding wire forces manufacturers to use other welding wires with similar, but not the same, composition as the workpiece, which can result in parts failing to meet required specifications for their particular applications. However, embodiments of the disclosed metal-cored aluminum welding wire 50 enable the formation of high-alloy aluminum weld deposits, like the deposit indicated in Table 9, which are not possible or practical without the use of the metal-cored aluminum welding wire 50 described herein.

Table 10 includes the composition of the sheath 52, the core 54, and the total wire 50 for an embodiment of the metal-cored aluminum welding wire 50 capable of providing the weld deposit chemistry set forth above with respect to Table 9. For the example welding wire 50 represented in Table 10, the sheath 52 is an Al 1100 seamed or seamless sheath having the indicated composition. The core 54 of the example welding wire 50 is a mixture of four different powders, three of which (i.e., Al—Cu, Al—Mn, and Al—Mg) are alloys having substantially lower melting points than the melting points of the individual elements of the respective alloys (i.e., Al, Cu, Mn, and Mg). Additionally, for the example welding wire 50, the Al—Cu and Al—Mg alloys are eutectic alloys having the lowest possible melting points of all Al—Cu and Al—Mg alloys, respectively. Also, for the example welding wire 50, both the Al—Cu and Al—Mg alloys have substantially lower melting points than the other powdered components of the core 54, and are present in suitable quantities to melt before and surround (e.g., trap, capture) the higher-melting powdered components of the core 54, as discussed above. Furthermore, the melting point of the sheath 52, namely 1190° F. (solidus)-1215° F. (liquidus), is substantially greater than the solidus of the core 54, namely 819° F.

TABLE 10

Breakdown of the composition and contribution of the sheath 52 and the core 54 of the example embodiment of the metal-cored aluminum welding wire 50 for example 5, with the remaining elemental composition of the wire being aluminum and trace elements.

| | Sheath (Al 6063) | | | Core | | | | Total |
|---|---|---|---|---|---|---|---|---|
| | wt % in Sheath | Portion of Wire that is Sheath (wt %) | Elemental Contribution to Wire (wt %) | Alloy in Core | Melting Point of Alloy (° F.) | wt % Element in Alloy | wt % Alloy in Wire | Elemental Contribution to Wire (wt %) | Elemental Composition of Wire (wt %) |
| Si | 0.03 | 84.25 | 0.03 | — | — | — | — | — | 0.03 |
| Fe | 0.12 | | 0.10 | — | — | — | — | — | 0.12 |
| Cu | 0.09 | | 0.08 | Al-Cu | 1018 | 33 | 13.80 | 4.55 | 4.63 |
| Mn | — | | — | Al-Mn | 1652 | 25 | 1.30 | 0.33 | 0.33 |
| Mg | — | | — | Al-Mg | 819 | 66 | 0.40 | 0.26 | 0.26 |
| Ti | 0.005 | | 0.00 | Ti | 3038 | 100 | 0.25 | 0.25 | 0.26 |

According to another aspect of the present disclosure, metal-cored aluminum wire comprising aluminum metal matrix nano-composites (Al-MMNCs) may be formed by additive manufacturing. As compared to base aluminum alloys, Al-MMNCs exhibit properties such as high strength-to-weight ratio, excellent mechanical properties, resistance to creep at elevated temperatures good fatigue strength, and reduced crack sensitivity. Nanoscale reinforcement tends to have a greater reinforcing effect than microscale reinforcement in metallic systems due to the strong bonding at atomic level between the matrix and nanoparticles. Moreover, because there is both inter- and intra-granular nano-reinforcement in the metal matrix, both the Hall-Petch strengthening effect (grain size has a strong influence on strength since grain boundaries can hinder the dislocation movement) and Orowan strengthening effect (the non-shearable nanoparticles pin crossing dislocations and promote dislocations bowing around the particles (Orowan loops) under external load) contribute to material strengthening of Al-MMNCs.

Moreover, the addition of nanoparticles to an aluminum matrix changes the melting and solidifying processing during welding. The added nanoparticles reduce heat dissipation rate in the molten pool, making the welding zone is deeper with a narrower heat-affected zone. The nanoparticles increase viscosity in the molten pool, which suppress thermocapillary flow. This enables the control of microstructure of the weld.

Nanoparticles can cause some intrinsic challenges in the welding process. It may be difficult to retain the nanoscale grain size owning to the excessive grain growth during processing. Nanoparticles tend to agglomerate and cluster due to high surface energy, electrostatic, moisture adhesiveness, and attractive van der Waals forces. This can inhibit the uniform distribution of nanoparticles during processing. Therefore, in order to prevent the nanoparticles from dissolving, low heat input welding process is preferred, such as Miller Advanced Short Circuiting Arc Welding Process and Laser Hot-Wire Welding. To further facilitate the uniform distribution of nanoparticles in the weld, an ultrasonic-assisted method can be used.

Different kinds of ceramic nanoparticles may be added into the aluminum matrix to form Al-MMNCs, such as alumina ($Al_2O_3$), boron carbide ($B_4C$), carbon nanotubes (CNT), graphite (Gr), titanium dioxide ($TiO_2$), silicon carbide (SiCp), tungsten carbide (WC), silicon nitride ($Si_3N_4$), aluminum nitride (AlN), titanium carbide (TiC), and silica ($SiO_2$).

The core 54 may contain Al-MMNCs that comprise an aluminum metal matrix and ceramic nanoparticles. The ceramic particles may have an average particle size of between approximately 5 nm and 500 nm, for example an average particle size of between approximately 10 and 250 nm, or an average particle size of between approximately 25 and 200 nm, or an average particle size of between approximately 30 and 150 nm, or an average particle size of between approximately 40 and 100 nm, or an average particle size of between approximately 50 and 70 nm, or an average grain size of approximately 60 nm. The aluminum metal matrix may have a grain size that is similar or equivalent to the particle size of the ceramic nanoparticles. In other embodiments, the aluminum metal matrix may have a grain size that is larger than the particle size of the ceramic nanoparticles.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A metal-cored aluminum welding wire, comprising:
   a metallic sheath; and
   a granular core disposed within the metallic sheath, wherein the granular core includes a first alloy comprising a plurality of elements, wherein the first alloy has a solidus that is lower than each of the respective melting points of each of the plurality of elements of the first alloy;
   wherein the solidus of the metallic sheath is at least 5% greater than the solidus of the first alloy;
   wherein the granular core includes additional alloys, wherein each of the additional alloys has a solidus that is higher than the solidus of the first alloy; and
   wherein the granular core further includes aluminum metal matrix nano-composites (Al-MMNCs) that comprise an aluminum metal matrix and ceramic nanoparticles, wherein the ceramic nanoparticles have an average particle size of between 10 and 250 nm.

2. The welding wire of claim 1, wherein the metallic sheath is a seamless metallic sheath comprising an extruded aluminum alloy tube.

3. The welding wire of claim 1, wherein the first alloy is a eutectic alloy or near-eutectic alloy.

4. The welding wire of claim 3, wherein the first alloy is an aluminum-beryllium eutectic alloy, an aluminum-copper eutectic alloy, an aluminum-iron eutectic alloy, an aluminum-lithium eutectic alloy, an aluminum-magnesium eutectic alloy, an aluminum-silicon eutectic alloy, or an aluminum-zinc eutectic alloy.

5. The welding wire of claim 3, wherein the first alloy is a titanium-boron eutectic alloy, a titanium-zirconium eutectic alloy, or a zirconium-vanadium eutectic alloy.

6. The welding wire of claim 3, wherein the granular core includes a second alloy that is a eutectic or near-eutectic alloy.

7. The welding wire of claim 1, wherein the granular core comprises greater than 25% of the first alloy by weight.

8. The welding wire of claim 1, wherein the welding wire comprises less than 5% non-metal components by weight.

9. The welding wire of claim 1, wherein the metallic sheath is a 6xxx series aluminum alloy or a 1xxx series aluminum alloy.

10. The welding wire of claim 1, wherein the metallic sheath is a 4xxx series aluminum alloy or a 5xxx series aluminum alloy.

11. The welding wire of claim 1, wherein the ceramic nanoparticles comprise alumina ($Al_2O_3$), boron carbide ($B_4C$), carbon nanotubes (CNT), graphite (Gr), titanium dioxide ($TiO_2$), silicon carbide (SiCp), tungsten carbide (WC), silicon nitride ($Si_3N_4$), aluminum nitride (AlN), titanium carbide (TiC), or silica ($SiO_2$).

12. The welding wire of claim 11, wherein the ceramic nanoparticles comprise alumina ($Al_2O_3$).

13. The welding wire of claim 11, wherein the ceramic nanoparticles comprise carbon nanotubes (CNT).

14. The welding wire of claim 1, wherein the ceramic nanoparticles have an average particle size of between 25 and 200 nm.

15. The welding wire of claim 14, wherein the ceramic nanoparticles have an average particle size of between 30 and 150 nm.

16. The welding wire of claim 15, wherein the ceramic nanoparticles have an average particle size of between 40 and 100 nm.

17. The welding wire of claim 16, wherein the ceramic nanoparticles have an average particle size of between 50 and 70 nm.

18. The welding wire of claim 17, wherein the ceramic nanoparticles have an average particle size 60 nm.

19. The welding wire of claim 1, wherein the grain size of the aluminum metal matrix is larger than the particle size of the ceramic nanoparticles.

\* \* \* \* \*